United States Patent
Bank et al.

(10) Patent No.: US 10,332,217 B2
(45) Date of Patent: Jun. 25, 2019

(54) MANAGEMENT OF ONLINE COMMUNITY MERGE EVENTS

(71) Applicant: International Business Machines Corporation, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 14/279,448

(22) Filed: May 16, 2014

(65) Prior Publication Data

US 2015/0331865 A1 Nov. 19, 2015

(51) Int. Cl.
| | |
|---|---|
| *G06F 17/30* | (2006.01) |
| *G06Q 50/00* | (2012.01) |
| *G06F 16/28* | (2019.01) |
| *G06F 16/951* | (2019.01) |
| *G06F 16/2457* | (2019.01) |

(52) U.S. Cl.
CPC ....... *G06Q 50/01* (2013.01); *G06F 16/24573* (2019.01); *G06F 16/24578* (2019.01); *G06F 16/285* (2019.01); *G06F 16/951* (2019.01)

(58) Field of Classification Search
CPC ......... G06F 17/30598; G06F 17/30604; G06F 17/30525; G06F 17/30864; G06Q 50/01
USPC ....................................................... 707/723
See application file for complete search history.

(56) References Cited

U.S. PATENT DOCUMENTS

| | | | | |
|---|---|---|---|---|
| 6,330,561 B1 * | 12/2001 | Cohen | .............. | G06F 17/30902 707/754 |
| 7,447,775 B1 * | 11/2008 | Zhu | .................. | H04N 21/23439 709/217 |
| 7,761,441 B2 * | 7/2010 | Chung | .............. | G06F 17/30979 707/706 |
| 8,060,470 B2 * | 11/2011 | Davidson | .......... | G06F 17/30306 707/634 |

(Continued)

OTHER PUBLICATIONS

IBM, "Arbitrary grouping of discussion threads in a forum", IP.com Prior Art Database Technical Disclosure, IP.com No. IPCOM000150672D, Apr. 19, 2007. http://ip.com/IPCOM/000150672.

(Continued)

*Primary Examiner* — Pierre M Vital
*Assistant Examiner* — Nargis Sultana
(74) *Attorney, Agent, or Firm* — Jared L. Montanaro (57) ABSTRACT

A method includes selecting community groups having a first community from a plurality of communities and a second community from the plurality of communities. The method includes collecting a plurality of community factors that each describe the first community and the second community. The method also includes determining a plurality of correlation values, for each community factor from the plurality of community factors, between the first community and the second community. The method also includes calculating a community merge score from the plurality of correlation values. The method also includes merging the community group in response to a community merge score threshold being met by the community merge score.

16 Claims, 4 Drawing Sheets

(56) References Cited

U.S. PATENT DOCUMENTS

| | | | |
|---|---|---|---|
| 8,103,618 B2 | 1/2012 | Carter et al. | |
| 8,122,479 B2* | 2/2012 | Britt | H04N 7/1675 725/93 |
| 8,166,026 B1* | 4/2012 | Sadler | G06F 17/30864 707/725 |
| 8,412,679 B1* | 4/2013 | Venkatesan | G06Q 10/00 707/608 |
| 8,554,645 B1* | 10/2013 | Hwu | G06Q 10/06 705/2 |
| 9,165,299 B1* | 10/2015 | Stowe | G06F 17/30412 |
| 9,195,753 B1 | 11/2015 | King et al. | |
| 2001/0044833 A1* | 11/2001 | Eisendrath | G06Q 10/10 709/217 |
| 2002/0049760 A1* | 4/2002 | Scott | G06F 17/30067 |
| 2002/0178162 A1* | 11/2002 | Ulrich | G06F 9/5083 |
| 2004/0260600 A1* | 12/2004 | Gross | G06Q 30/02 705/7.31 |
| 2005/0198128 A1* | 9/2005 | Anderson | G06F 17/24 709/204 |
| 2005/0246193 A1* | 11/2005 | Roever | G06Q 40/00 705/35 |
| 2005/0246358 A1* | 11/2005 | Gross | G06Q 30/02 |
| 2006/0069765 A1* | 3/2006 | Okamura | G06F 17/30902 709/223 |
| 2006/0123127 A1* | 6/2006 | Littlefield | G06Q 10/107 709/229 |
| 2006/0271564 A1* | 11/2006 | Meng Muntz | G06Q 10/00 |
| 2006/0282402 A1* | 12/2006 | Takahashi | G06F 17/30011 |
| 2007/0071193 A1* | 3/2007 | Aoki | H04M 7/0036 379/93.25 |
| 2008/0098313 A1* | 4/2008 | Pollack | G06F 3/048 715/753 |
| 2008/0133269 A1* | 6/2008 | Ching | G06F 19/328 705/2 |
| 2008/0306985 A1* | 12/2008 | Murray | G06Q 10/10 |
| 2010/0280991 A1* | 11/2010 | Chen | G06F 17/30592 707/602 |
| 2011/0107379 A1* | 5/2011 | Lajoie | H04L 65/1016 725/87 |
| 2011/0138400 A1* | 6/2011 | Chandler | G06F 9/546 719/314 |
| 2011/0202426 A1* | 8/2011 | Cretney | G06Q 30/06 705/26.8 |
| 2011/0238430 A1* | 9/2011 | Sikorski | G06Q 10/10 705/1.1 |
| 2011/0246482 A1* | 10/2011 | Badenes | G06F 17/30011 707/748 |
| 2011/0258391 A1* | 10/2011 | Atkisson | G06F 11/108 711/118 |
| 2012/0023107 A1* | 1/2012 | Nachnani | G06F 17/30303 707/748 |
| 2012/0059724 A1* | 3/2012 | Nichols | G06Q 30/0241 705/14.66 |
| 2012/0096385 A1* | 4/2012 | Bank | G06Q 10/109 715/772 |
| 2012/0239661 A1* | 9/2012 | Giblin | G06F 17/30817 707/741 |
| 2012/0246131 A1* | 9/2012 | Semerdzhiev | G06F 17/30067 707/695 |
| 2012/0296833 A1* | 11/2012 | Sharma | G06Q 10/10 705/300 |
| 2012/0296967 A1* | 11/2012 | Tao | G06Q 30/0251 709/204 |
| 2013/0297699 A1* | 11/2013 | Yoshida | G06Q 30/02 709/204 |
| 2013/0304772 A1* | 11/2013 | Fay | G06Q 50/01 707/821 |
| 2014/0006400 A1* | 1/2014 | Bastide | G06Q 10/0639 707/737 |
| 2014/0108422 A1* | 4/2014 | Taylor | G06F 17/3089 707/748 |
| 2014/0108428 A1* | 4/2014 | Luo | G06Q 10/10 707/748 |
| 2014/0181120 A1* | 6/2014 | Sullivan | G06Q 50/01 707/748 |
| 2014/0280594 A1* | 9/2014 | Everton | H04L 51/32 709/204 |
| 2014/0289159 A1* | 9/2014 | Das | G06Q 30/0282 705/347 |
| 2014/0344039 A1* | 11/2014 | Kowalczyk | G06Q 50/01 705/14.19 |
| 2014/0379729 A1* | 12/2014 | Savage | H04L 65/403 707/748 |
| 2015/0006708 A1* | 1/2015 | Banke | H04L 67/22 709/224 |
| 2015/0032609 A1* | 1/2015 | Abuelsaad | G06Q 20/102 705/40 |
| 2015/0088906 A1* | 3/2015 | Pal | G06Q 50/01 707/749 |
| 2015/0220627 A1 | 8/2015 | Lamba et al. | |
| 2015/0242967 A1* | 8/2015 | Shsh | G06Q 50/01 705/319 |

OTHER PUBLICATIONS

IBM, "Content Analytics", IBM Software Products, http://www-03.ibm.com/software/products/en/category/content-analytics.

"Moderation Tool Behavior", getsatisfcation.com, © Get Satisfaction, Inc., https://getsatisfaction.com/corp/help/moderation-tools/.

"Social analytics", Wikipedia: the Free Encyclopedia, (last modified Oct. 7, 2013), http://en.wikipedia.org/wiki/Social_Analytics.

* cited by examiner

MANAGEMENT OF ONLINE COMMUNITY MERGE EVENTS

BACKGROUND

The present disclosure relates to online communities, and more specifically, to managing the merging of online communities.

Online communities can be an effective mode for community members to collaborate. There are millions of public communities within the web-based infrastructure with millions of community owners. A particular user may not think of leveraging the existing online community and start a fresh community. However, when interest or topics align, it can be beneficial to merge a group of online communities to increase the members of the communities and the influences of the community discussions.

SUMMARY

Embodiments of the present disclosure provide for a method, system, and computer program product for managing a community merge operation.

One embodiment is directed toward a method for managing a community merge operation. The method includes selecting a community group having a first community from a plurality of communities and a second community from the plurality of communities. Each community in the plurality of communities shares information between members in a community application hosted by a host server. The method includes collecting a plurality of community factors that each describe the first community and the second community. The method also includes determining a plurality of correlation values, for each community factor from the plurality of community factors, between the first community and the second community. The method also includes calculating a community merge score from the plurality of correlation values. The method also includes merging the community group in response to a community merge score threshold being met by the community merge score.

Another embodiment is directed toward a system for use with a host server that is configured to host a community application that manages a plurality of communities that have one or more community factors shared amongst at least some of the plurality of communities. The system includes one or more computer processor circuits that are configured to host a community merge application. The community merge application is configured to select a community group having a first community from a plurality of communities and a second community from the plurality of communities. The community merge application is configured to collect a plurality of community factors that each describe the first community and the second community. The community merge application is configured to determine a plurality of correlation values, for each community factor from the plurality of community factors, between the first community and the second community. The community merge application is configured to calculate a community merge score from the plurality of correlation values. The community merge application is configured to merge the community group in response to a community merge score threshold being met.

Another embodiment is directed toward a computer program product for managing a community merge operation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to online communities, more particular aspects relate to managing the merging of online communities. For instance, a community merge application can select a community group to compare. For each community group, community factors are compared for each community to produce a correlation value. The correlation value is weighted based on a weight for the community factor to produce a community merge score. The community merge application uses the community merge score to determine whether to merge the community group. While the present disclosure is not necessarily limited to such applications, various aspects of the disclosure may be appreciated through a discussion of various examples using this context.

The present disclosure can perform social and content analysis of the public online communities to determine communities of common topics/interest and suggest that the community owner should merge the communities. An online (virtual) community can be a social network of individuals who interact through specific social media, potentially crossing geographical and political boundaries in order to pursue mutual interests or goals. Online communities encourage interaction, sometimes focusing around a particular interest. Community members in the online community are allowed to interact over a shared passion through various means: message boards, short message service (SMS) platforms, wiki pages, chat rooms, social networking sites, or virtual worlds. An online community can act as an information system where members can post, comment on discussions, and give advice.

A community application can manage one or more communities within a community environment. The community application can maintain various community factors. Community factors may be fields that are shared amongst communities. For example, community factors can include times when the communities are active, members that are shared, and topics that are discussed. The community application can utilize a community merge application to control the merging of communities. The community merge application can search through communities, wikis, blogs, etc. The community merge application can identify topics that are heavily overlapped with a high degree of correlation and suggest to the community owners to merge them.

The community merge application can contain additional functions such as an analytic module and a weighting module to perform the operations involved in managing the merging of online communities. In addition, the community merge application can be a subroutine or a function of the community application that manages the communities on a distributed network such as the Global Internet or an intranet. An example of an online community application includes IBM® Connections. The community group in the community merge application can refer to two or more separate communities that are evaluated for merging.

Figure 1:
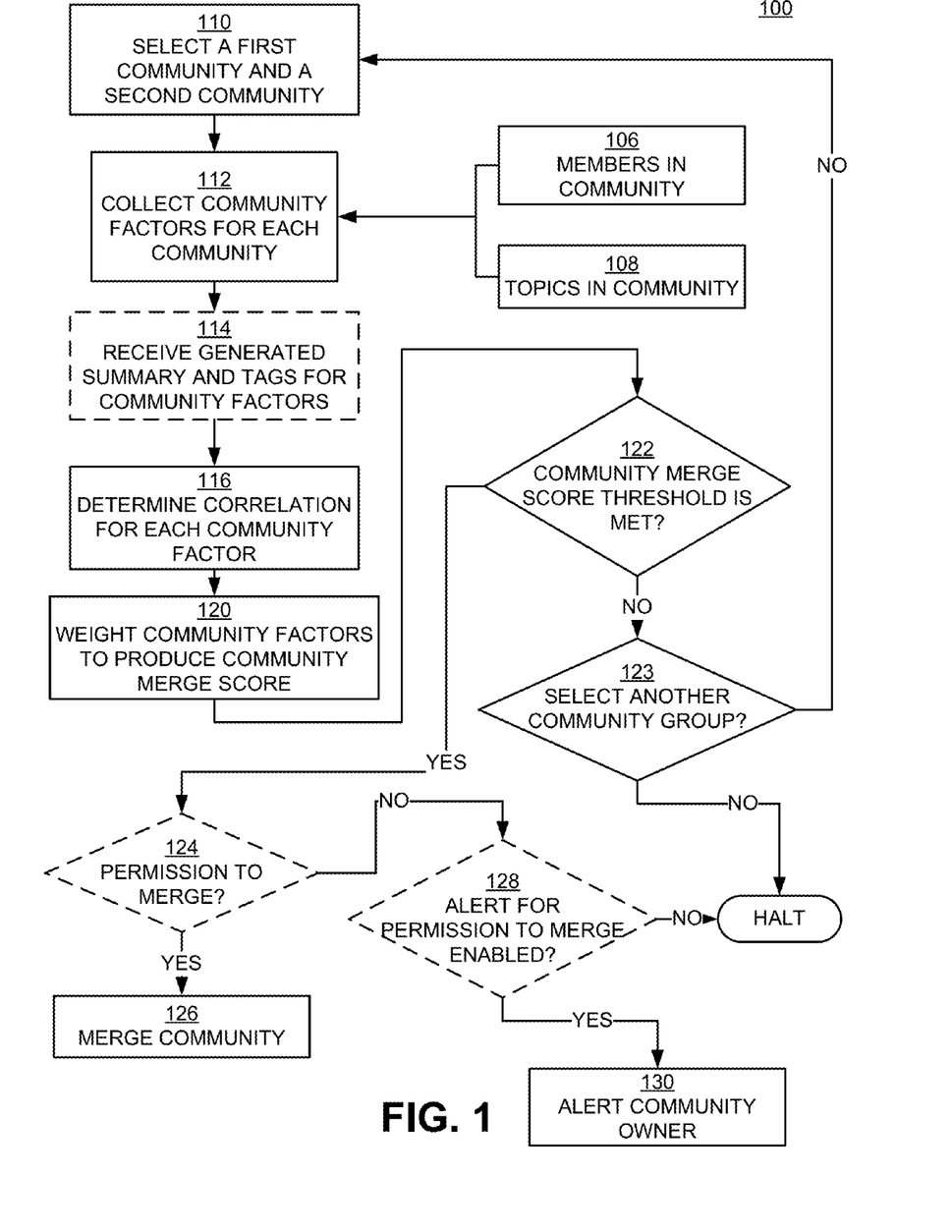
FIG. 1 illustrates a flowchart of a method of determining whether to merge a community using one or more community factors.

FIG. 1 illustrates a flowchart of a method 100 of determining whether to merge a community using one or more community factors. The method 100 can involve selecting a community group and performing analysis on the community group. Each community in the community group may be distinct from the other community. The community merge application can include modules to perform certain operations. For example, an analytic module may analyze one or more community factors for each community. The community factors analyzed may be the same for both communities. The community merge application can also include a weighting module to determine the relative weight of each community factor and produce a community merge score. The method 100 begins at operation 110.

In operation 110, the analytic module can select a first community and a second community as part of a community group. The first community and second community can be selected from a plurality of communities. The first community and second community can be selected by a user of a community application. For example, the user or administrator can select a first community and then be prompted to select a second community to compare with first community. Although reference is made to a community group, the concept of community group may be expanded to allow for grouping of more than two communities. For example, three communities can be compared in using individual pairwise comparisons. Each pairwise comparison can be evaluated for potential merging and one or more pairings can be selected based upon the evaluations.

In various embodiments, one community from the community group can be declared as a primary community. The primary community can be set and the other communities can be variable for comparison purposes. More than one community group can be selected at once. For example, two or more separate community groups can be selected and analyzed in parallel. Once the community group is selected, then the method 100 continues to operation 112.

In operations 112 through operation 126, an analysis may be performed for the community group. For example, once a community group is selected, then it may be analyzed by the analytic module while the analytic module is collecting community factors. In various embodiments, an analysis may be performed in an iterative manner. For example, as a first community group is analyzed, and the first community group does not meet a community merge score threshold, then a second community group can be selected.

In operation 112, the analytic module can collect a plurality of community factors for each community. Community factors describe the first community and the second community and identify properties for a community. Examples of community factors include topics 106, members 108, dates of formation, activity, files, binaries, keyword search, overview of the community, wikis, media gallery, etc. The data associated with the community factors can be collected by the analytic module. For example, if the shared members between communities is a community factor, then individual member lists or member profiles can be the data associated with the community factor "members". Once the community factors are collected, then the method 100 continues to operation 114.

In operation 114, generated summary and tags are received by the analytic module for the community factors. Tags may be referred to as meta-information tags. Tags store meta-information and each tag can represent captured knowledge about an information resource. For example, tags on a paragraph can indicate the content of the paragraph. In various embodiments, the summary and tags are generated by analyzing the content of the community. The analytic module can receive the generated tags and summary for the measured community factor, e.g., a topic. In various embodiments, the generation of the summary and tags may be optional. Once the tags and summary are generated, then the method 100 continues to operation 116.

In operation 116, the analytic module can determine a correlation value, for each community factor, between the first community and the second community. The correlation value can represent the correlation between the community factor from the first community and the community factor for the second community. The correlation value can be measured in a variety of methods. For example, the analytic module can determine the correlation value between two topics in a first community and a second community by using tags to determine a percent overlap of the tags.

The analytic module can also determine a correlation value with respect to combinations of community factor attributes. For example, for the community factor "topics", the analytic module can examine tags in the community group. For a hunting community and a pet community, the tag "ducks" can have a different context. When combined with another tag, e.g., "ducks" and "decoy" or "ducks" and "duck cage" can further identify the context further. Thus, in the example provided, the correlation value between the topics for combinations of tags can be used to produce more accurate correlations between communities.

Various statistical techniques can be employed to determine the correlation between multiple community factors within a community group. For example, statistical techniques can include the Pearson product-moment correlation coefficient, Rank correlation coefficient, scatter plots, and so forth. The correlation value is described further herein. Once the correlation value is determined, then the method 100 continues to operation 120.

In operation 120, a weighting module can receive a plurality of correlation values and weight the plurality of correlation values to produce a community merge score. The community merge score is an aggregate of the correlation values of the community factors weighted based on the priority of each community factor. The priority of each community factor can be influenced by the predicted performance gains on the host server by merging communities having the community factor. For example, if the communities have millions of members posting content, but the host server is constrained, then a high correlation value for members shared between communities could be weighted higher than topics shared. The predicted performance can be based on the gain or loss of computing performance on the host server by merging communities. The computing performance may refer to computing resources within a server. The computing resources may be used by the computing machinery or computing device described herein. The computing resources may be measured by network resources, processing resources used, storage used, etc. The community merge score is a score that represents the likely benefit of merging the community group. For example, a community group that has a high correlation value will likely benefit from the merging of the communities.

In various embodiments, the correlation values for each community factor in the community group can be pre-screened before weights are applied. For example, an administrative user may determine that correlation value for community factor "topic" should have at least a 40% correlation value between the community group based on the match on prior operations. Otherwise, there may not be a benefit to performing the weighting because avoiding the weighting operation can result in performance gains.

The community merge score can be relative to the number of community factors. For example, for three community factors, each of the community factors can represent 33% of the final community merge score. New information may be collected when the method 100 collects community factor data in parallel with the processing. For example, if data concerning a community factor is collected for a community group while the correlation values are being determined. The community merge score can be modified as new information is collected. For example, for three community factors, if only the first two community factors are known, then a community merge score can be calculated based on the first two community factors and then later modified once the third community factor is determined. The scale of the community merge score can also be defined. For example, if the maximum community merge score is 9, then each community factor of the 3 community factors can be ranked using a scale that has a high score of 3 (e.g., assuming all three communities are evenly weighted and the added to create the merge score).

In various embodiments, the community merge score can be unweighted, i.e., has a weight factor of 100%. For example, for a community group with the members and topics as community factors, if the number of members in common is 5 and the number of topics in common is 40, then the community merge score can be 45.

Additionally, the community merge score can also consider the expected performance gains from merging two separate communities. For example, assuming that a first community uses 0.5 Mega Bits (MB)/second on web server A (i.e., host server A) and a second community uses 0.7 MB/second on web server B (i.e., host server B), then merging the two communities onto web server A can result in a 0.7 MB/second being freed on web server B. If the maximum bandwidth of web server B is 1 MB/second and the 2 MB/second for web server A, then the merging the community onto web server A results in a higher score since web server B would have more proportionate resources freed by the merging. In another example, if web server B does not have enough resources compared to web server A, then the communities are weighted to favor merging the communities onto web server A. Once the community factors are weighted, then the method 100 continues to operation 122.

In operation 122, the community merge application can determine whether the community merge score is within a community merge score threshold for the community group. The community merge score determined in operation 120 can have an associated threshold value. The community merge score threshold can use the same units of the value that are used for the community merge threshold. For example, if the community merge score is a percentage, then the community merge score threshold can also be a percentage. The community merge score threshold can be met when the community merge score is above the community merge score threshold, meaning that the communities are correlated enough to merge. If the community merge score threshold is not met, then the method 100 can continue to operation 123. If the community merge score threshold is met, then the method 100 can continue to operation 124.

In operation 123, the community merge application can determine whether to select another community group. The selection may be made by preference or a user. If the community merge application determines that another community group is to be selected, then the method 100 continues to operation 110. In operation 110, a third community and a fourth community are selected from the plurality of communities to form a new community group. In various embodiments, a community from the community group can be reused in a new community group. For example, a third community can be the same as the first community. If the community merge application determines not to select another community group, then the method 100 halts.

In operation 124, the community merge application determines whether the communities have permission to merge. In various embodiments, operation 124 is considered optional and the community group is assumed to always have permission to merge. Permission to merge can be determined by prompting owners of the first community and the second community with a request to merge both the first community and the second community into a single community. If the first community owner and second community owner agree to the merge, then the method 100 continues to operation 126 where the communities are merged.

In various embodiments, the permission to merge can be by a majority vote in each community. For example, if the first community and second community members vote to merge communities and first community has a majority of members vote yes but second community does not have a majority of members vote yes, then the community merge application does not have permission to merge the communities. If there is no permission to merge, then the method 100 continues to operation 128.

In operation 126, the community merge application merge the community group. During a merge, the member profiles and their respective permissions for a first community are combined with other member profiles and their respective permissions for a second community. The topics that were generated from both communities are also merged into a single community. In various embodiments, the community merge application can extract and delete certain topics from multiple communities and merge them into a totally new community. The community merge application can merge the second community into the first community or vice versa.

In operation 128, the community merge application can determine whether an alert for permission to merge is enabled. In various embodiments, the alert for a lack of permission to merge can be enabled by default and make operation 128 optional. The alert can comprise a visual indication to a community owner or members that the community can not merge. In various embodiments, the owners can indicate a threshold of percent of overlapped content that would trigger an alert in the future. If the alert is not enabled, then the method 100 halts and members of the community are not informed of a failed merge. If the alert is enabled, then the method 100 continues to operation 130. In operation 130, the community merge application can alert the second community owner and the first community owner in response to not obtaining permission to merge. A community owner that has a denied merge can try to merge with another community.

Figure 2:
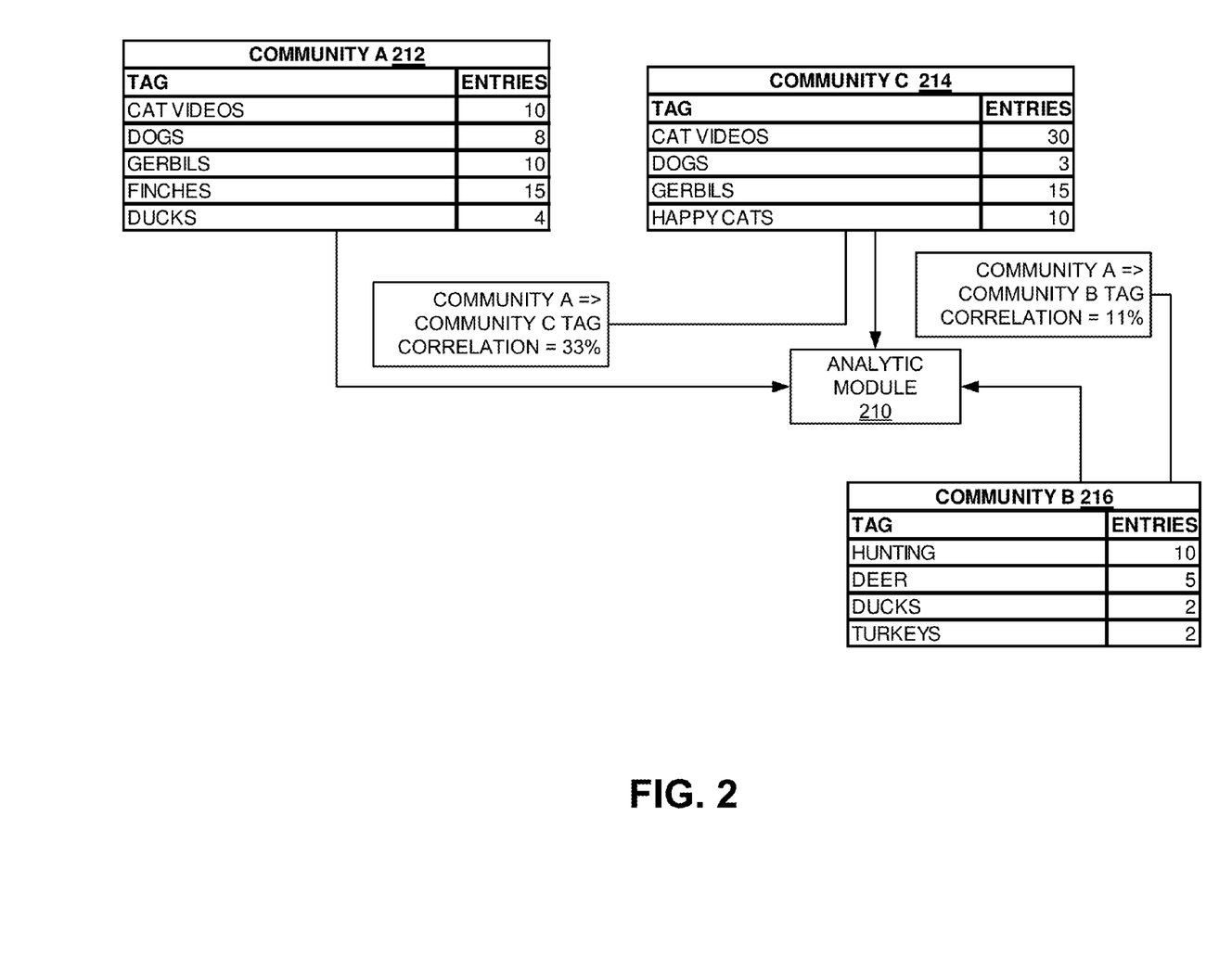
FIG. 2 illustrates an analytic module for determining a correlation between topics within two or more communities, according to various embodiments.

FIG. 2 illustrates an analytic module 210 for determining a correlation between topics within two or more communities, according to various embodiments. The analytic module 210 that analyzes the various communities, e.g., community A 212, community B 216, community C 214, for correlation. In the analytic module, community A 212 can be the primary community and be compared to both community B 216 and community C 214 in parallel. In various embodiments, the analytic module 210 can form a first pair that includes community A 212 and community B 216 and a second pair that includes community A 212 and community C 214.

The analytic module 210 can determine the correlation between the various community factors. Community A 212, community B 216, and community C 214 each have various tags and each community can record the number of times that the tags appear in the community. When determining a correlation between community A 212 and community B 216, the analytic module 210 can analyze the tags in each community. For example, between community A 212 and community B 216, the analytic module 210 can determine that only the tags for ducks is shared between the two communities.

In various embodiments, the analytic module 210 can also analyze the context of the tags. Community A 212 can be a pet related community, community C 214 can be a cat video enthusiast community, and community B 216 can be a hunting community. For example, ducks in the context of hunting can have a different meaning than ducks in the context of pets. However, over multiple tags, e.g., 20,000 tags, the context may be less relevant to each tag. For example, with a large sample set, a vastly different subject of community in a community group would be less likely to have a high correlation value between multiple tags with another different subject of community.

Between community A 212 and community B 216, there are 9 tags with 1 shared tag. The analytic module 210 can determine that the correlation between the two communities is 1/9=11%. The same analysis can be performed between community A 212 and community C 214. The analytic module 210 can determine that the correlation between the communities is 33%. The analytic module 210 can provide the determined correlation values between the community groups to the community merge application which can further apply a weighting module to the correlation values.

Figure 3:
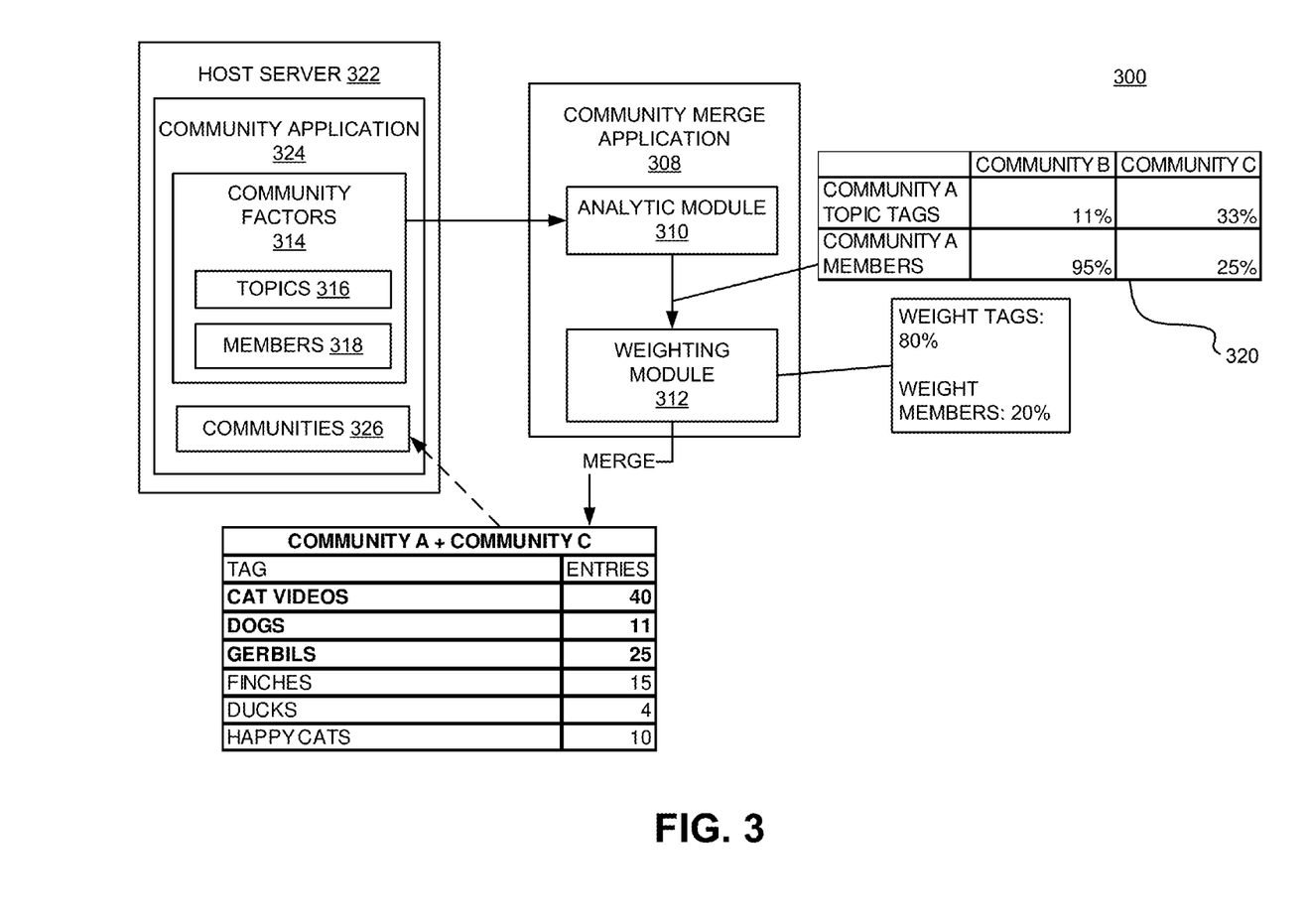
FIG. 3 illustrates a system configured to weight a plurality of correlation values, according to various embodiments.

FIG. 3 illustrates a system 300 configured to weight a plurality of correlation values, according to various embodiments. The system 300 can include a host server 322. The host server 322 may host a variety of online applications, including a community application 324. The community application 324 can manage various communities 326 within its ecosystem. The community application 324 can monitor one or more community factors 314 from each community 326. The system 300 can include a community merge application 308 that manages the merging of communities within the community application 324. In various embodiments, the community merge application 308 can be associated with the community application 324. The community merge application 308 may also act independent from the community application 324.

The community merge application 308 can include an analytic module 310. The analytic module 310 is similar in configuration to the analytic module 210 in FIG. 2. The application 300 can also have a weighting module 312. The weighting module 312 can be responsible for receiving a plurality of correlation values from the analytic module 310 and weighting each of the correlation values according to a weight.

As discussed herein, the analytic module 310 can receive a plurality of community factors 314 from the community application 324. The plurality of community factors 314 can include topics 316 and members 318. The analytic module 310 can determine the correlation values between the community factors of a community group. The correlation values between a community group can be aggregated on table 320. Table 320 illustrates the correlation values between community A and community B and between community A and community C. The correlation values can be for the topic tags or for the members that correspond to the community factors 314 of topics 316 and members 318, respectively. In table 320, the correlation value between community A and community C is higher for topics but the correlation value between community A and community B is higher for members.

In various embodiments, community A and community C can form a distinct community group from community A and community B. According to various embodiments of the disclosure, the community group selection can occur in parallel, e.g., one community group is selected and analyzed with another community group and analyzed by the analytic module 310 in parallel. The community groups in the application 300 can represent two scenarios of community group analysis. For example, if community A and community B are selected and analyzed, then community A and community C are selected and analyzed. The correlation values of both community A and community B are shown to illustrate the weighting module 312 for the sake of comparison.

The correlation values are received by the weighting module 312. The weighting module applies the weight to the correlation values of the community group. For example, the weight for the tags can be 80% but the weight for the members can be 20%. The weighting module 312 can produce a community merge score that takes into account the weight of the various correlation values of the community factors 314 In various embodiments, the community merge score can follow the formula:

$$\sum_{N=1}^{N \rightarrow TotalNumberofCommunityFactors} \text{Weight}_{communityfactorN} (CorrelationValue_{communityfactorN})$$

In one specific example, the community merge score between community A and community C can be 33%*80%+25%*20%=0.314 which is greater than the community merge score between community A and community B, e.g., 11%*80%+95%*20%=0.278. Although one example is provided, embodiments of the present disclosure may have different methods of determining a community merge score. For instance, the community merge score can have a maximum value of 100 and the correlation values are scaled to 100. The community merge score can also have correlation value outliers removed from consideration before each correlation value is weighted.

Once the community A and community C are selected for merge, the topics with the same tag can merge into large discussion groups. In various embodiments, the members in each community may also merge into a larger community. In various embodiments, once a merge decision has been made by the community merge application 308, the community application 324 can implement the merging of communities. The merging can be implemented by the community application 324.

Figure 4:
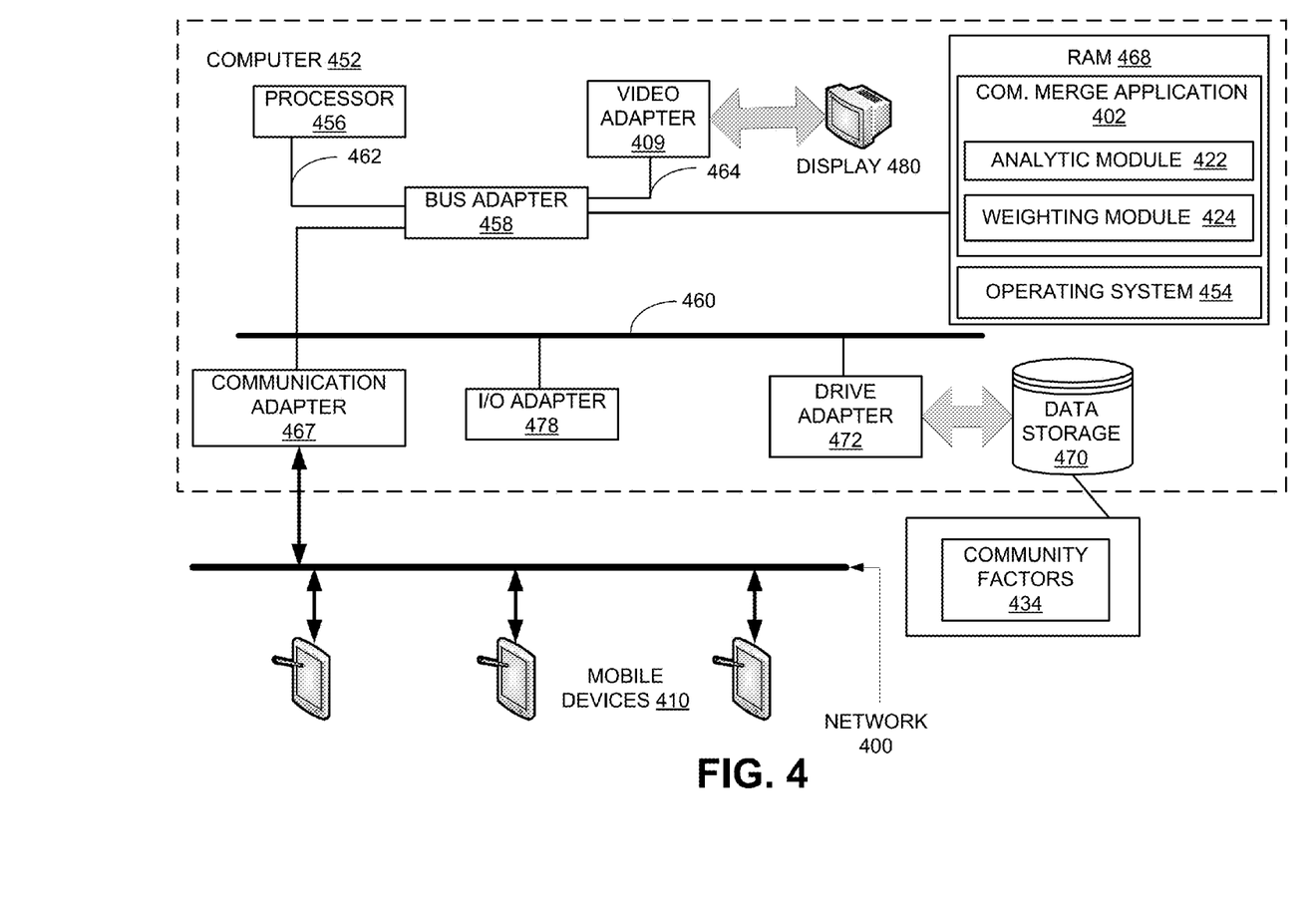
FIG. 4 illustrates a block diagram of automated computing machinery, according to various embodiments.

FIG. 4 illustrates a block diagram of automated computing machinery, according to various embodiments. The computing machinery may include example computer 452 useful in performing aspects of the disclosure, according to various embodiments. The computer 452 of FIG. 4 includes at least one computer processor 456 or 'CPU' as well as random access memory 468 ('RAM') which is connected through bus adapter 458 to processor 456 and to other components of the computer 452.

The RAM 468 may include a community merge application 402. The community merge application 402 can determine whether to merge two or more communities and then merge the two or more communities. The community merge application 402 can have an analytic module 422 and a weighting module 424. The analytic module 422 can receive data regarding one or more community factors from a community group and determine the correlation value between the community factors within the community group. The community factors 434 can be populated into the data storage 470. The weighting module 424 can access the correlation values between the community factors for each community group and weight different community factors in order to produce a community merge score.

The RAM 468 may include an operating system 454. Operating systems useful for record filtering according to embodiments of the present invention include UNIX®, Linux®, Microsoft XP™, AIX®, IBM's i5/OS™, and others. The operating system 454 are shown in RAM (468), but many components of such software typically are stored in non-volatile memory also, such as, for example, on a disk drive 470.

The computer 452 may also include disk drive adapter 472 coupled through expansion bus 460 and bus adapter 458 to processor 456 and other components of the computer 452. Disk drive adapter 472 connects non-volatile data storage to the computer 452 in the form of disk drive 470. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The data storage 470 may include one or more storage devices in a tiered or non-tiered configuration. The data storage 470 can include one or more community factors that are received by the application and stored for later use by the community merge application 402.

The example computer 452 includes one or more input/output ('I/O') adapters 478. I/O adapters implement user-oriented input/output through, for example, software drivers and computer hardware for controlling output to display devices such as computer display screens, as well as user input from user input devices 481 such as keyboards and mice. The example computer 452 includes a video adapter 409, which is an example of an I/O adapter specially designed for graphic output to a display device 480 such as a display screen or computer monitor. Video adapter 409 is connected to processor 456 through a high speed video bus 464, bus adapter 458, and the front side bus 462, which is also a high speed bus.

The example computer 452 includes a communications adapter 467 for data communications with other computers 410, e.g., mobile devices, and for data communications with a data communications network 400. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for merging communities from a plurality of communities that share information between members of the communities using a community application hosted on a distributed computing environment that includes two or more servers, the method comprising:
    selecting a community group having a first community from the plurality of communities and a second community from the plurality of communities, wherein the first community is hosted on a first server and the second community is hosted on a second server;
    collecting a plurality of community factors that each describes the first community and the second community, wherein the plurality of community factors includes a first community factor and a second community factor associated with both the first community and the second community;
    determining a plurality of correlation values, for each community factor from the plurality of community factors, between the first community and the second community, wherein the plurality of correlation values include integers based on a comparison between the first community factor and the second community factor;
    calculating a community merge score from the plurality of correlation values, wherein calculating the community merge score includes weighting the plurality of correlation values with one or more predetermined values, the one or more predetermined values being based on a predicted performance of computing resources in the first and second servers, wherein the community merge score is an aggregation of the plurality of correlation values multiplied by the one or more predetermined values, wherein the one or more predetermined values increase the community merge score, and wherein the increased community merge score indicates a gain of predicted performance of computing resources by merging the first community and the second community onto the first server;

determining that the increased community merge score meets a community merge score threshold; and merging, in response to the community merge score threshold being met by the increased community merge score, the first community and second community of the community group onto the first server.

2. The method of claim 1, wherein merging the first community and the second community includes:
obtaining, from a first community owner of the first community and a second community owner of the second community, permission to merge the second community with the first community.

3. The method of claim 1, further comprising:
requesting, from a first community owner of the first community and a second community owner of the second community, permission to merge the second community with the first community; and
alerting the second community owner and the first community owner in response to not obtaining permission.

4. The method of claim 1, further comprising:
calculating another community merge score from the plurality of correlation values; and
selecting a third community and a fourth community from the plurality of communities to form a new community group in response to the community merge score threshold not being met by the another community merge score.

5. The method of claim 1, wherein determining the plurality of correlation values includes determining a percentage overlap of tags associated with the first community and the second community.

6. The method of claim 1 further comprising:
selecting a third community and a fourth community in parallel to selecting the first community and the second community;
analyzing, using pairwise comparisons, the first community and second community in parallel with the third community and fourth community; and
determining not to merge the third community and the fourth community.

7. The method of claim 1, wherein the predicted performance of computing resources is measured by network resources, processing resources used, and storage used by the first server and the second server.

8. The method of claim 1, wherein calculating the community merge score from the plurality of correlation values further comprises:
identifying, by a processor, all member tags associated with the first community and all member tags associated with the second community;
determining that one or more of the member tags identified are associated with both the first community and the second community;
generating a first member correlation value by dividing the number of member tags associated with both the first community and the second community by the sum of the number of member tags associated with the first community plus the number of member tags associated with the second community;
retrieving, from a dedicated weighting processor, a member weighting factor, wherein the member weighting factor is a first predetermined value;
generating a second member correlation value by multiplying the first member correlation value by the member weighting factor;
identifying all topic tags associated with the first community and all topic tags associated with the second community;
determining that one or more of the topic tags identified are associated with both the first community and the second community;
generating a first topic correlation value by dividing the number of topic tags associated with both the first community and the second community by the sum of the number of topic tags associated with the first community plus the number of member tags associated with the second community;
retrieving, from the dedicated weighting processor, a topic weighting factor, wherein the topic weighting factor is a second predetermined value;
generating a second topic correlation value by multiplying the first topic correlation value by the topic weighting factor; and
generating the community merge score by adding the second member correlation value and the second topic correlation value together.

9. A system in a distributed computing environment that includes two or more servers for hosting a community merge application that manages a plurality of communities that have one or more community factors shared amongst at least some of the plurality of communities, the system comprising:
one or more computer processor circuits that are configured to host the community merge application, the community merge application being configured to:
select a community group having a first community from the plurality of communities and a second community from the plurality of communities, wherein the first community is hosted on a first server and the second community is hosted on a second server;
collect a plurality of community factors that each describe the first community and the second community, wherein the plurality of community factors includes a first community factor and a second community factor associated with both the first community and the second community;
determine a plurality of correlation values, for each community factor from the plurality of community factors, between the first community and the second community, wherein the plurality of correlation values include integers based on a comparison between the first community factor and the second community factor;
calculate a community merge score from the plurality of correlation values, wherein calculating the community merge score includes weighting the plurality of correlation values with one or more predetermined values, the one or more predetermined values being based on a predicted performance of computing resources in the first and second servers, wherein the community merge score is an aggregation of the plurality of correlation values multiplied by the one or more predetermined values, wherein the one or more predetermined values increase the community merge score, and wherein the increased community merge score indicates a gain of predicted performance of computing resources by merging the first community and the second community onto the first server;

determine that the increased community merge score meets a community merge score threshold; and merge, in response to the community merge score threshold being met by the increased community merge score, the first community and second community of the community group onto the first server.

10. The system of claim 9, wherein the community merge application is further configured to merge the the first community and second community by:

obtaining, from a first community owner of the first community and a second community owner of the second community, permission to merge the second community with the first community.

11. The system of claim 9, wherein the community merge application is further configured to:

select a third community from the plurality of communities to form a new community group with the first community in response to the community merge score threshold not being met by the community merge score.

12. The system of claim 9, wherein the community merge application is configured to generate a new community by:

extracting a particular community factor from the plurality of community factors that describes both the first community and the second community, wherein the particular community factor is a topic;

deleting the particular community factor from both the first community and the second community; and merging the first community and the second community into a new community described by the remaining plurality of community factors.

13. A computer program product comprising a non-transitory computer readable storage device having a computer readable program stored therein, wherein the computer readable program, when executed on a computing device in a distributed computing environment that includes two or more servers, causes the computing device to:

select a community group having a first community from a plurality of communities and a second community from the plurality of communities, wherein the first community is hosted on a first server and the second community is hosted on a second server;

collect a plurality of community factors that each describes the first community and the second community, wherein the plurality of community factors includes a first community factor and a second community factor associated with both the first community and the second community;

determine a plurality of correlation values, for each community factor from the plurality of community factors, between the first community and the second community, wherein the plurality of correlation values include integers based on a comparison between the first community factor and the second community factor;

calculate a community merge score from the plurality of correlation values, wherein calculating the community merge score includes weighting the plurality of correlation values with one or more predetermined values, the one or more predetermined values being based on a predicted performance of computing resources in the first and second servers, wherein the community merge score is an aggregation of the plurality of correlation values multiplied by the one or more predetermined values, wherein the one or more predetermined values increase the community merge score, and wherein the increased community merge score indicates a gain of predicted performance of computing resources by merging the first community and the second community onto the first server;

determine that the increased community merge score meets a community merge score threshold; and merge, the community group in response to the community merge score threshold being met by the increased community merge score, the first community and second community of the community group onto the first server.

14. The computer program product of claim 13, wherein the computer readable program causes the computing device to merge the first community and the second community by:

obtaining, from a first community owner of the first community and a second community owner of the second community, permission to merge the second community with the first community.

15. The computer program product of claim 13, wherein the computer readable program causes the computing device to merge the the first community and the second community by:

alerting the second community owner and the first community owner in response to not obtaining permission.

16. The computer program product of claim 13, wherein the computer readable program causes the computing device to:

select a third community and a fourth community from the plurality of communities to form a new community group in response to the community merge score threshold not being met.

* * * * *